(12) United States Patent
Sumizawa et al.

(10) Patent No.: US 7,158,149 B2
(45) Date of Patent: Jan. 2, 2007

(54) MAP DATA TRANSMITTING METHOD, MAP DATA TRANSMITTING APPARATUS, INFORMATION DEVICE AND MAP DATA TRANSMITTING SYSTEM

(75) Inventors: Akio Sumizawa, Kanagawa (JP); Yoshinori Endo, Kanagawa (JP)

(73) Assignee: Xanavi Informatics Corporation, Zama (JP)

( * ) Notice: Subject to any disclaimer, the term of this patent is extended or adjusted under 35 U.S.C. 154(b) by 17 days.

(21) Appl. No.: 10/682,569

(22) Filed: Oct. 10, 2003

(65) Prior Publication Data

US 2004/0212627 A1 Oct. 28, 2004

(30) Foreign Application Priority Data

Oct. 10, 2002 (JP) ............................. 2002-297152

(51) Int. Cl.
*G06T 15/00* (2006.01)
*G06T 17/00* (2006.01)
*G01C 21/26* (2006.01)
*G08G 1/123* (2006.01)

(52) U.S. Cl. ...................... 345/619; 345/420; 701/201; 340/995.1

(58) Field of Classification Search ................ 345/619, 345/428, 440, 620–623, 441; 701/23, 24, 701/200, 201, 207, 208, 213, 214; 340/995.1–95.289
See application file for complete search history.

(56) References Cited

U.S. PATENT DOCUMENTS 5,341,463 A * 8/1994 Wescott et al. ............. 345/441

| | | | | |
|---|---|---|---|---|
| 5,966,136 A * | 10/1999 | Kurtz et al. | ................. | 345/620 |
| 2001/0024203 A1* | 9/2001 | Yamada et al. | ............. | 345/428 |
| 2002/0032520 A1* | 3/2002 | Katayama et al. | .......... | 340/995 |
| 2002/0062360 A1* | 5/2002 | Ishiguro | ..................... | 701/201 |
| 2004/0169653 A1* | 9/2004 | Endo et al. | ................. | 345/419 |

FOREIGN PATENT DOCUMENTS

JP 2002-107169 4/2002

* cited by examiner

*Primary Examiner*—Kee M. Tung
*Assistant Examiner*—Chante Harrison
(74) *Attorney, Agent, or Firm*—Crowell & Moring LLP

(57) ABSTRACT

A map data transmitting method for transmitting a map through communication comprises steps of setting a specific route, specifying map data contained in a slicing range within a predetermined distance from the route having been set based upon map data that include road data and background data, newly creating new polygon data if an original polygon data contained in the background data included in the specified map data is partially contained in the slicing range and another portion of the polygon is outside the slicing range, by removing polygon data corresponding to the portion outside the slicing range from the original polygon data and transmitting a road map specified in conformance to the map data and background data containing the new polygon data.

34 Claims, 13 Drawing Sheets

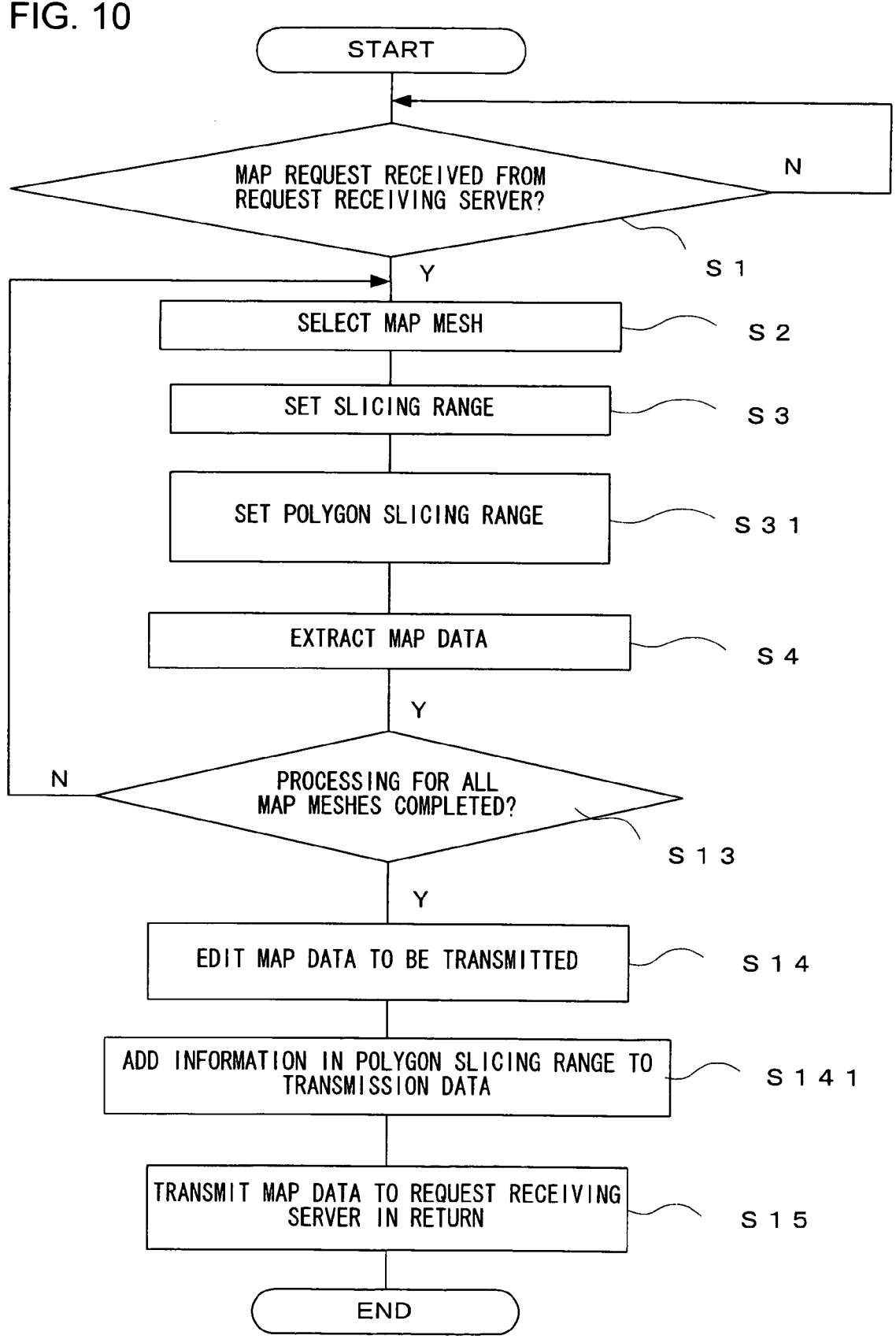

MAP DATA TRANSMITTING METHOD, MAP DATA TRANSMITTING APPARATUS, INFORMATION DEVICE AND MAP DATA TRANSMITTING SYSTEM

INCORPORATION BY REFERENCE

The disclosure of the following priority application is incorporated herein for reference: Japanese Patent Application No. 2002-297152 filed Oct. 10, 2002

BACKGROUND OF THE INVENTION

1. Field of the Invention

The present invention relates to a map data transmitting technology that enables transmission of map data to be used at an information terminal such as a navigation apparatus mounted in a vehicle through communication.

2. Description of the Related Art

There is an information communication-based navigation system in the related art that mainly comprises a navigation apparatus installed in a vehicle and an information transmitting center that executes a route search to determine a route to a destination or transmits map data in response to a request issued from the navigation apparatus. In the existing map data transmitting method adopted in the information communication-based navigation system, map data obtained by slicing data within a specific range around the route are transmitted in the original form. However, background data contained in the map data may include polygon data indicating a background with a planar area such as an ocean, a lake or a field. A given set of polygon data indicates a specific contour with an area boundary line defined by a plurality of nodes connected with one another. Thus, if a portion of such polygon data is contained in the specific range and nodes corresponding to this range alone are extracted, the connection of the area boundary line becomes cut off and, as a result, the correct shape of the planar area cannot be represented. This point is not addressed in the related art.

SUMMARY OF THE INVENTION

The present invention provides a map data transmitting technology that allows polygon data corresponding to an area ranging beyond the slicing range to be transmitted in an appropriate form.

(1) A map data transmitting method according to the present invention comprises steps of; setting a specific route, specifying map data contained in a slicing range within a predetermined distance from the route having been set based upon map data that include road data and background data, newly creating a new polygon data if an original polygon data contained in the background data included in the specified map data is partially contained in the slicing range and another portion of the original polygon data is outside the slicing range, by removing polygon data corresponding to the portion outside the slicing range from the original polygon data and transmitting a road map specified in corresponding to the map data and background data containing the new polygon data.

(2) In this map data transmitting method, in the transmitting step, either the original polygon data or the new polygon data may be transmitted based upon the difference between the data volume of the original polygon data and the data volume of the new polygon data or the a real ratio of the two types of data. At this time, if the new polygon data are transmitted, information indicating that the new polygon data are transmitted should be appended to the transmission data.

(3) It is to be noted that the route set in the map data transmitting method described above may be a recommended route calculated based upon the current point and a destination.

(4) A map data transmitting apparatus according to the present invention executes the map data transmitting method described above.

(5) An information terminal according to the present invention comprises a reception unit that receives map data transmitted from the map data transmitting apparatus and a display unit that displays a map based upon the map data having been received.

(6) This information terminal may further comprise a requesting unit that issues a request for the new polygon data.

(7) Another information terminal according to the present invention comprises a reception unit that receives map data which include road data and background data corresponding to a slicing range within a predetermined distance from a route having been set, a creation unit that newly creates a new polygon data, if an original polygon data contained in the background data included in the map data is partially contained in the slicing range and another portion of the original polygon data is outside the slicing range, by removing polygon data corresponding to the portion outside the slicing range from the original polygon data and a display unit that displays a map based upon the map data and the new polygon data having been received.

(8) Another map data transmitting method according to the present invention comprises steps of; setting a specific route, extracting a road map corresponding to a first slicing range within specific distance from the route having been set and background data corresponding to a second slicing range within specific distance from the route having been set, based upon map data that include road data and background data, and transmitting the road data and the background data having been extracted.

(9) In the map data transmitting method described above, in the extracting step, if a portion of the original polygon data is included in the second slicing range and another portion of the original polygon data is outside the second slicing range, the new polygon data may be created by removing the polygon data outside the second slicing range from the original polygon data and background data containing the new polygon data may be transmitted.

(10) A map data transmitting apparatus according to the present invention executes the map data transmitting method described above.

(11) Another information terminal according to the present invention includes a reception unit that receives map data transmitted from the map data transmitting apparatus and a display unit that displays a map based upon the map data having been received.

(12) It is desirable that the information terminal displays the new polygon data in a display mode which indicates that the polygon data on display are different from the original polygon data.

BRIEF DESCRIPTION OF THE DRAWINGS

FIG. 10 presents a flowchart of the processing through which a polygon slicing range is set in the map information transmitting system in the third embodiment;

DESCRIPTION OF THE PREFERRED EMBODIMENTS

First Embodiment

Figure 1:
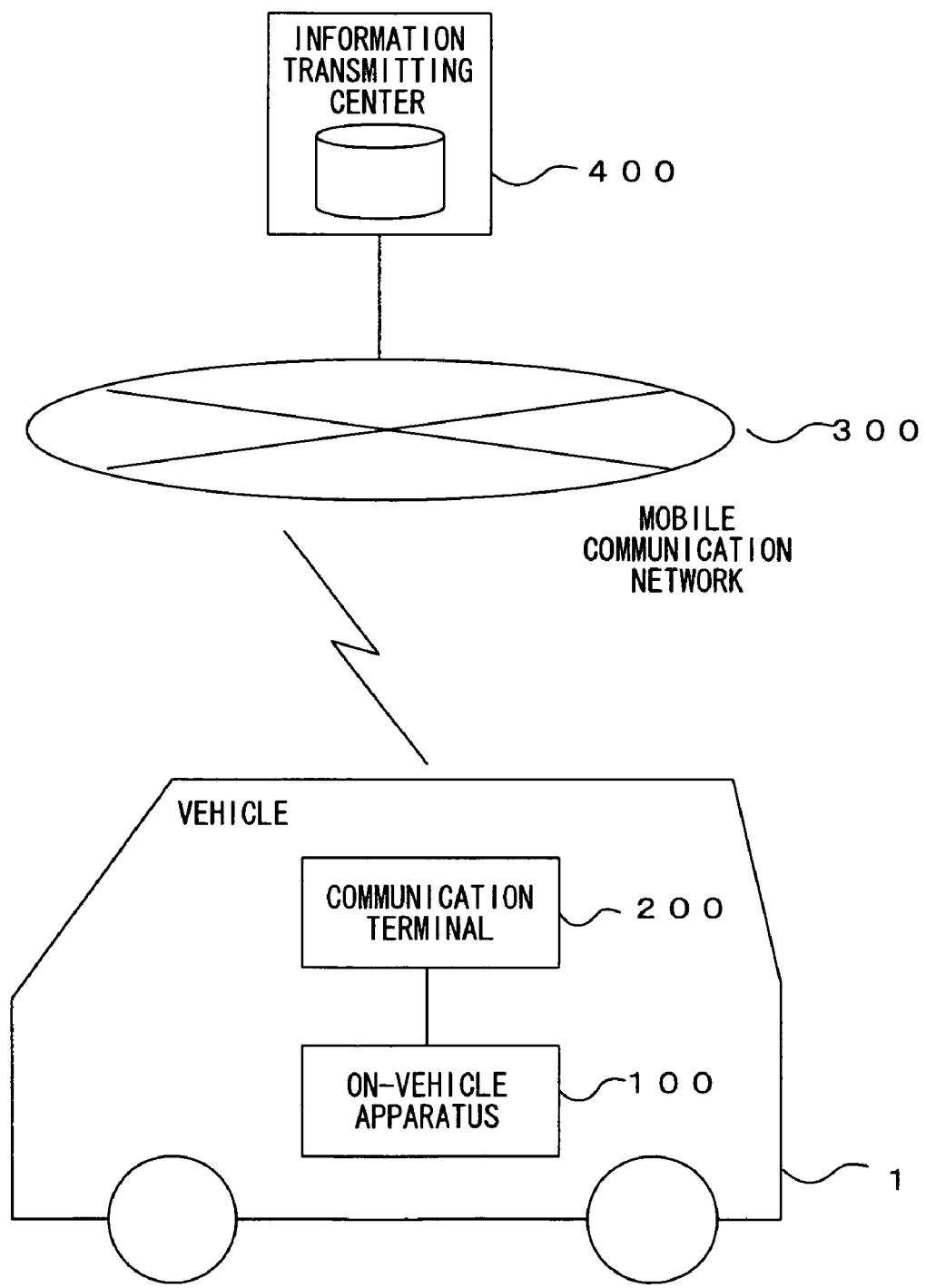
FIG. 1 is a block diagram showing the configuration of the map information transmitting system adopted in first through third embodiments.

The first embodiment in which the present invention is adopted in a map information transmitting system that operates in conjunction with car navigation apparatus is explained in reference to FIGS. 1 to 7B. A car navigation apparatus (hereafter referred to as an on-vehicle apparatus) 100 installed in a vehicle 1 is connected to a communication terminal 200 through a communication cable. The communication terminal 200 is connected by radio to an information transmitting center 400 via a mobile communication network 300. The information transmitting center 400 receives various requests from the on-vehicle apparatus 100 transmitted from the communication terminal 200 and provides various information including map data to the on-vehicle apparatus 100 in correspondence to the contents of the requests. The communication terminal 200 maybe, for instance, a portable telephone.

Figure 2:
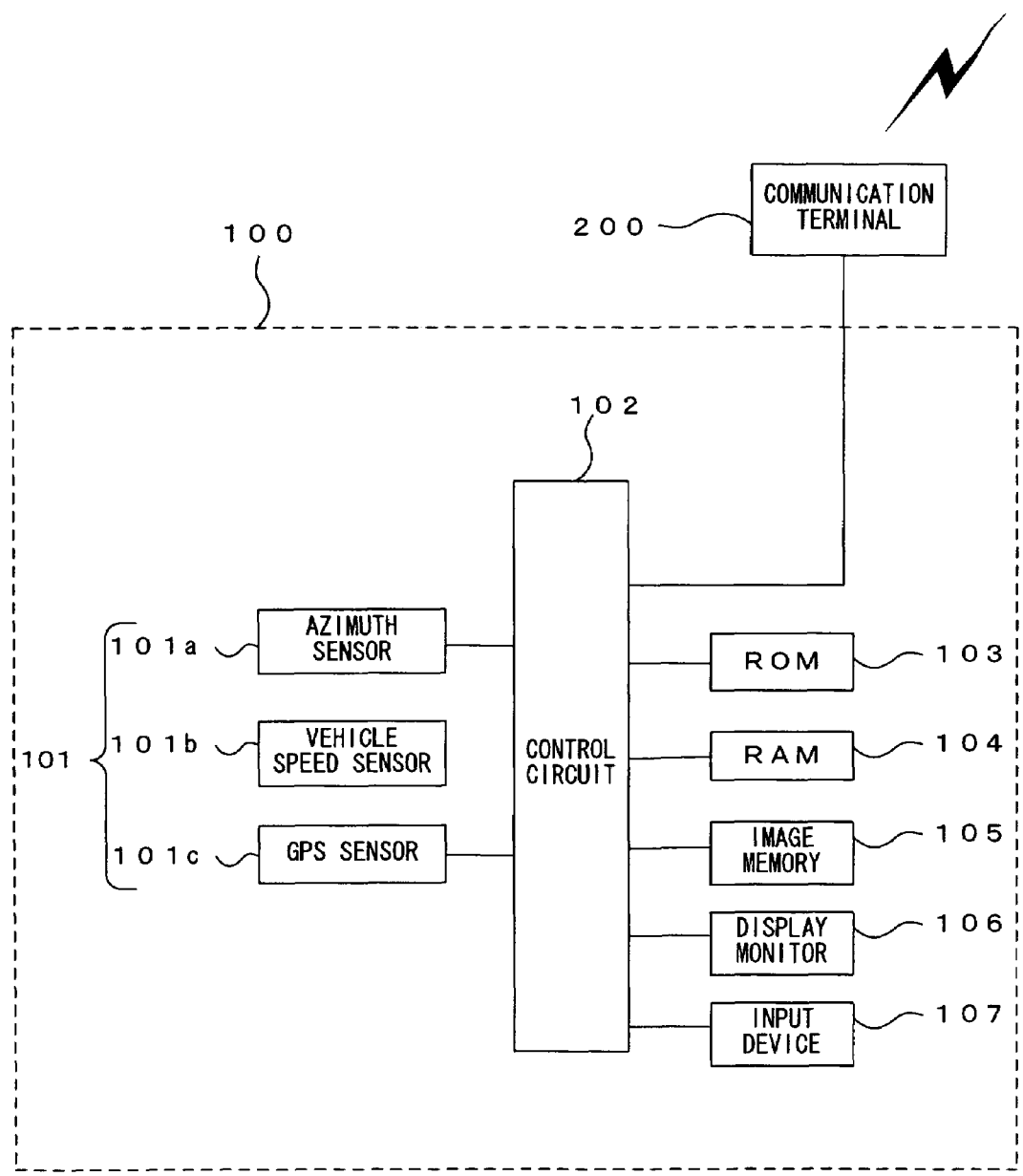
FIG. 2 is a block diagram showing the structure adopted in an on-vehicle apparatus in the map information transmitting system in the first through third embodiments.

FIG. 2 is a system block diagram showing the structure adopted in the on-vehicle apparatus 100. A current point detection device 101 which detects the current point of the vehicle may be constituted of, for instance, an azimuth sensor 101a that detects the advancing azimuth of the vehicle, a vehicle speed sensor 101b that detects the vehicle speed, a GPS sensor 101c that detects a GPS signal provided from a GPS satellite and the like. A control circuit 102, which is constituted of a microprocessor and its peripheral circuits, implements various types of control by executing a control program stored in a ROM 103 in a work area constituted of a RAM 104.

In an image memory 105, image data to be displayed at a display monitor 106 are stored. The image data constituted of road map drawing data, various types of graphic data and the like are used to display map information at the display monitor 106 based upon map data transmitted from the information transmitting center 400 shown in FIG. 1. An input device 107 includes various switches through which a destination to which the vehicle is traveling and the like are input. The communication terminal 200 exchanges various types of communication data with the control circuit 102 and is connected by radio to the information transmitting center 400 via the mobile communication network 300.

Figure 3:
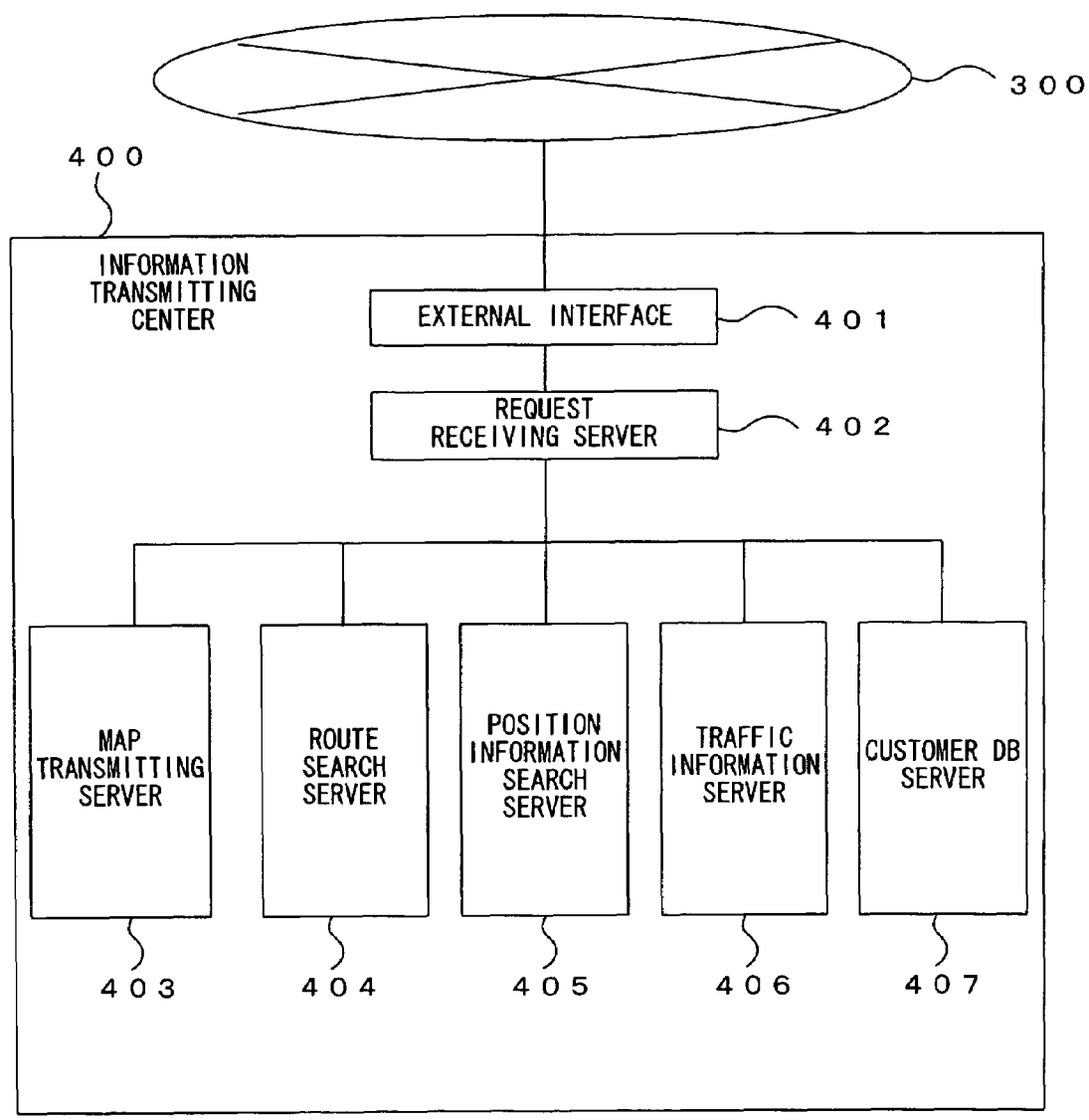
FIG. 3 is a block diagram of the structure adopted in the information transmitting center in the map information transmitting system in the first through third embodiments.

FIG. 3 is a system block diagram showing the structure of the information transmitting center 400. The information transmitting center 400 is connected with the mobile communication network 300 via an external interface 401. A request receiving server 402 receives requests such as route search request transmitted thereto through the external interface 401 and issues requests such route search requests and map requests for individual servers to be detailed later so as to execute the corresponding types of processing. It also outputs the processing results output from the various servers to the external interface 401.

At a map transmitting server 403, map data are stored in a storage medium such as a hard disk. In response to a map request issued by the request receiving server 402, the map transmitting server 403 searches for corresponding map data in the map data stored therein and outputs the map data specified through the search to the request receiving server 402. In response to a route search request issued by the request receiving server 402, a route search server 404 searches for a route corresponding to the request by using position information provided by a position information search server 405 and a traffic information database provided by a traffic information server 406 and outputs the search results. The position information search server 405 searches for facility information corresponding to an area around a specific geographical point. The traffic information server 406 holds a database containing current traffic information. A customer DB server 407 holds personal data of a customer owning the on-vehicle apparatus 100 and updates the personal data based upon the status of the utilization of the information transmitting center 400. The personal data include, for instance, account information.

Figure 4:
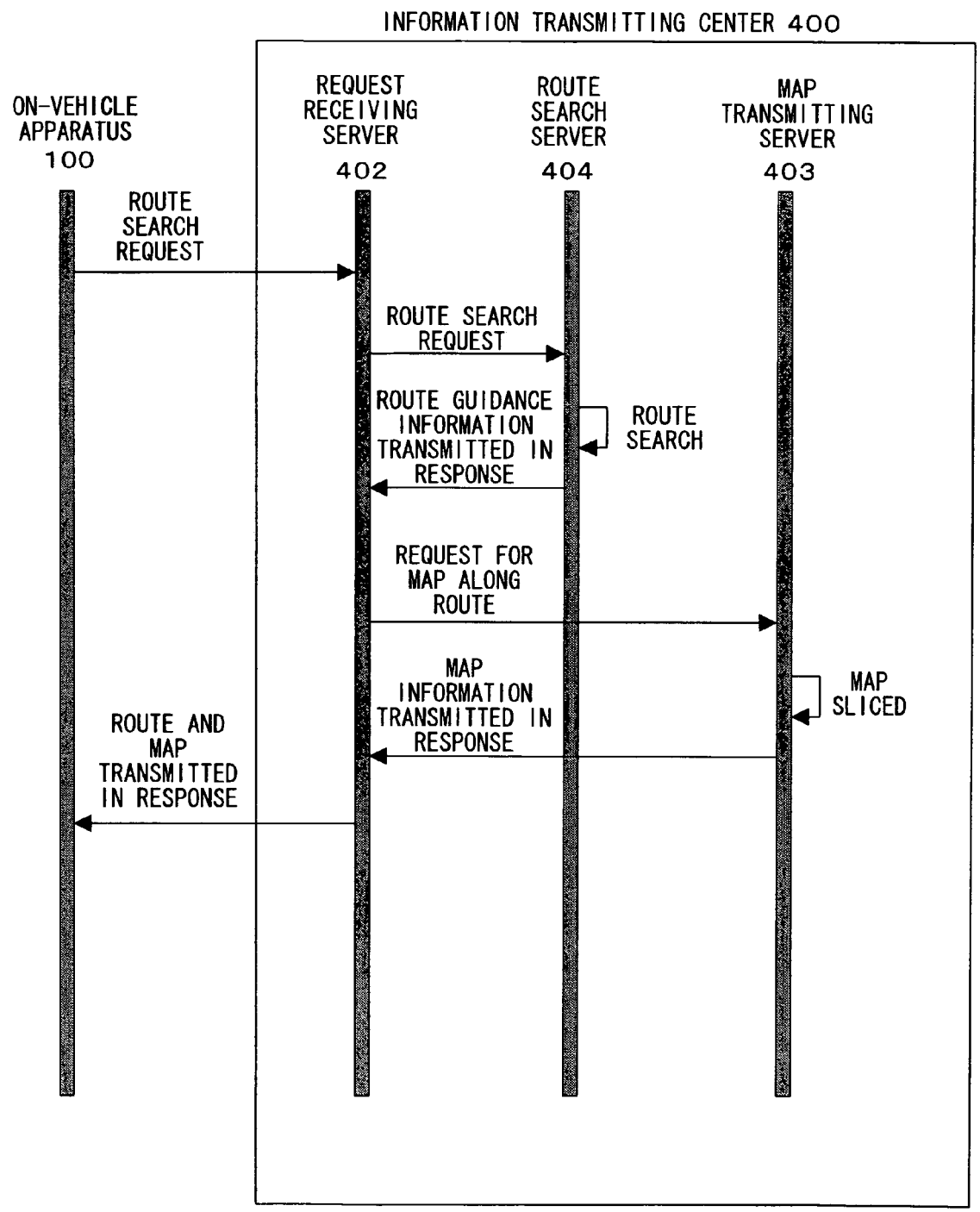
FIG. 4 illustrates the flow of data exchange when a route search is requested.

The flow of data exchanged when a route search is requested is shown in FIG. 4. As a destination is input through the input device 107, the on-vehicle apparatus 100 issues a route search request. The route search request issued by the on-vehicle apparatus 100 is transmitted to the information transmitting center 400 via the communication terminal 200 and the mobile communication network 300. The route search request received at the information transmitting center 400 first passes through the external interface 401 and is then input to the request receiving server 402 where the request contents are recognized. The request receiving server 402 then issues a route search request to the route search server 404. The route search server 404 executes a route search based upon the traffic information provided by the traffic information server 406 and sends back the route search results to the request receiving server 402. Upon receiving the route search results from the route search server 404, the request receiving server 402 outputs a map request with regard to the route to the map transmitting server 403. The map transmitting server 403 extracts map information obtained by slicing map data in a specific range along the route from the map data stored therein through the method detailed later and sends back the sliced map information to the request receiving server 402.

The request receiving server 402 having received the map information as described above outputs route guidance data resulting from the route search and the map information data to the external interface 401. The output data are transmitted to the on-vehicle apparatus 100 via the mobile communication network 300 and the communication terminal 200. At the on-vehicle apparatus 100, the information transmitted thereto is provided to the user as an image brought up on display. The series of the route search processing is thus completed.

Figure 5A:
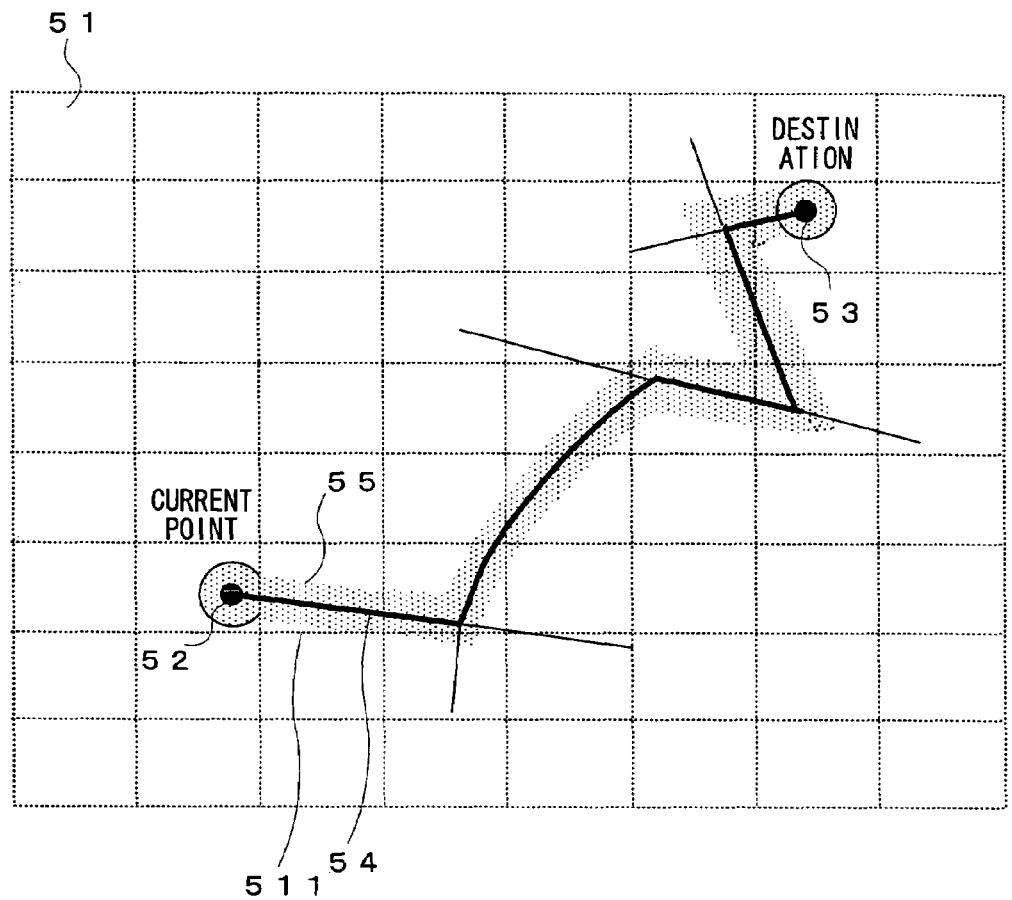
FIG. 5A shows a method through which a map within a specific range along the route is sliced.

FIG. 5A shows a method through which a map within a specific range along the route having been set, i.e., a map contained in a slicing range within a predetermined distance from the recommended route, is sliced. As a destination is set at the on-vehicle apparatus 100, the route search server 404 sets a current point 52 and the destination 53 and a recommended route 54 connecting the current point 52 and the destination 53 is set through route search calculation processing of the known art. A slicing range 55 along the route is set over a predetermined range around the route 54, e.g., the meshed range in the figure. In addition, the range is set to cover larger areas around the current point 52 and the destination 53 compared to the range set along the route extending between them. The map data within this slicing range 55 are extracted in units of individual meshes in a grid 51 dividing the map into uniform ranges covering areas equal to one another, and the extracted map data are transmitted from the information transmitting center 400 to the on-vehicle apparatus 100 as map information data.

Figure 6:
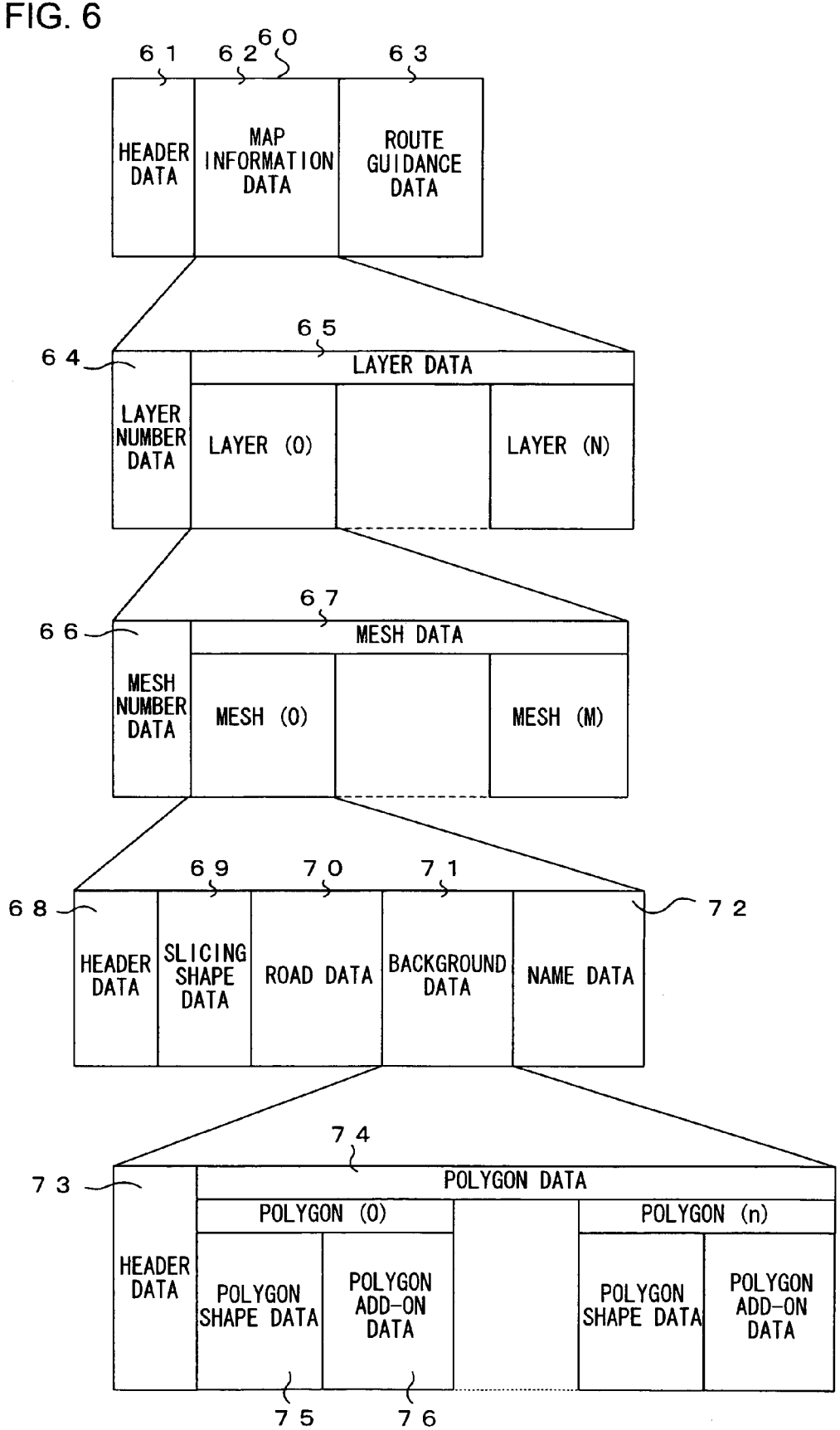
FIG. 6 shows an example of the structure of map data that are transmitted.

An example of a structure that may be adopted in the map data when the search results are transmitted to the on-vehicle apparatus 100 is shown in FIG. 6. It is to be noted that the structure of the data, which does not bear direct relevance to the present invention, is not explained in detail. Map data 60 is constituted of header data 61, map information data 62 and route guidance data 63. Various types of data for management are included in the header data 61. The route guidance data 63 are constituted of data including name data, shape data and right/left turn data with regard to guidance points set on the searched route, such as intersections and buildings. The map information data 62 are constituted of layer number data 64 and layer data 65. The layer data 65 are constituted of data contained in layer (0) to layer (N) Layer (0) to layer (N) are defined as maps on varying scales. The layer number data 64 indicate the number of layers (N+1 layers in this example).

Data in layer (0), for instance, in the layer data 65 are constituted of mesh number data 66 and mesh data 67. Data in other layers, too, are constituted of similar data. The mesh data 67 include data in mesh (0) to mesh (M). Mesh (0) to mesh (M) are each defined as one of the areas covering uniform ranges into which the map on the scale defining layer (0) is divided. The mesh number data 66 indicate the number of meshes (M+1 meshes in the example).

Data in mesh (0), for instance, in the mesh data 67 include header data 68, slicing shape data 69, road data 70, background data 71 and name data 72. Data in the other meshes include similar data. The header data 68 include various types of data for management. The slicing shape data 69 include information indicating the setting for a polygon slicing range which is to be detailed later. The road data 70 are constituted of data indicating the shapes roads and the road connecting states. The name data 72 are constituted of data indicating the names of the roads and the names of backgrounds. The roads and the backgrounds are contained in the road data 70 and the background data 71.

The background data 71 are constituted of header data 73 indicating the number of polygons and the like and polygon data 74. The term "polygon" in this context refers to data indicating a planar area in the background data, e.g., an ocean, a lake, a river, a field or the like. While the background data 71 also include dot data indicating a dot-like background object and line data indicating a linear background object as well as polygon data, such dot data and line data are not shown in FIG. 6. It is to be noted that depending upon the map scale, even the types of background objects that would otherwise be classified as polygons may be represented by dot data or line data instead of polygon data. The polygon data 74 include data corresponding to polygon (0) to polygon (n). For instance, the data corresponding to polygon (0) in the polygon data 74 are constituted of polygon shape data 75 and polygon add-on data 76. Data corresponding to other polygons, too, are constituted of similar data.

The polygon shape data 75 indicate the shape of the polygon area, i.e., the contour of the boundary of the polygon. This shape is expressed with a combination of nodes each indicating a coordinate position on the map. The polygon add-on data 76 contain information indicating that the polygon has been sliced, as detailed later.

In the map information transmitting system achieved in the first embodiment, the shape of a polygon is altered in conformance to the area covered by the map slicing range if a portion of the area of the polygon is contained in the map slicing range. This alteration is referred to as polygon slicing. When a polygon is sliced, information indicating the polygon has been sliced appended onto the polygon add-on data 76.

It is to be noted that map data of the entire nation assuming the data structure shown in FIG. 6 are stored in the map transmitting server 403. Namely, in response to a route search request, a map along the recommended route extending from the current point to the destination is sliced from the nationwide map database and the map data for transmission shown in FIG. 6 are created.

Figure 7A:
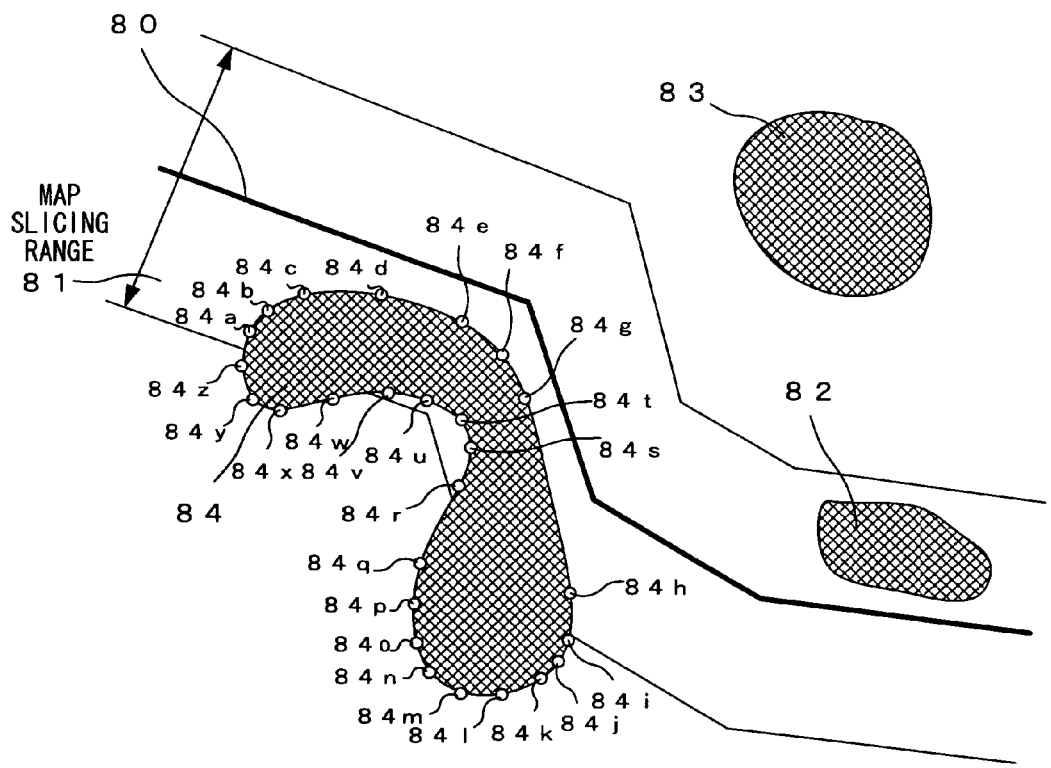
FIG. 7A shows polygons in the map data in a pre-sliced state.
Figure 7B:
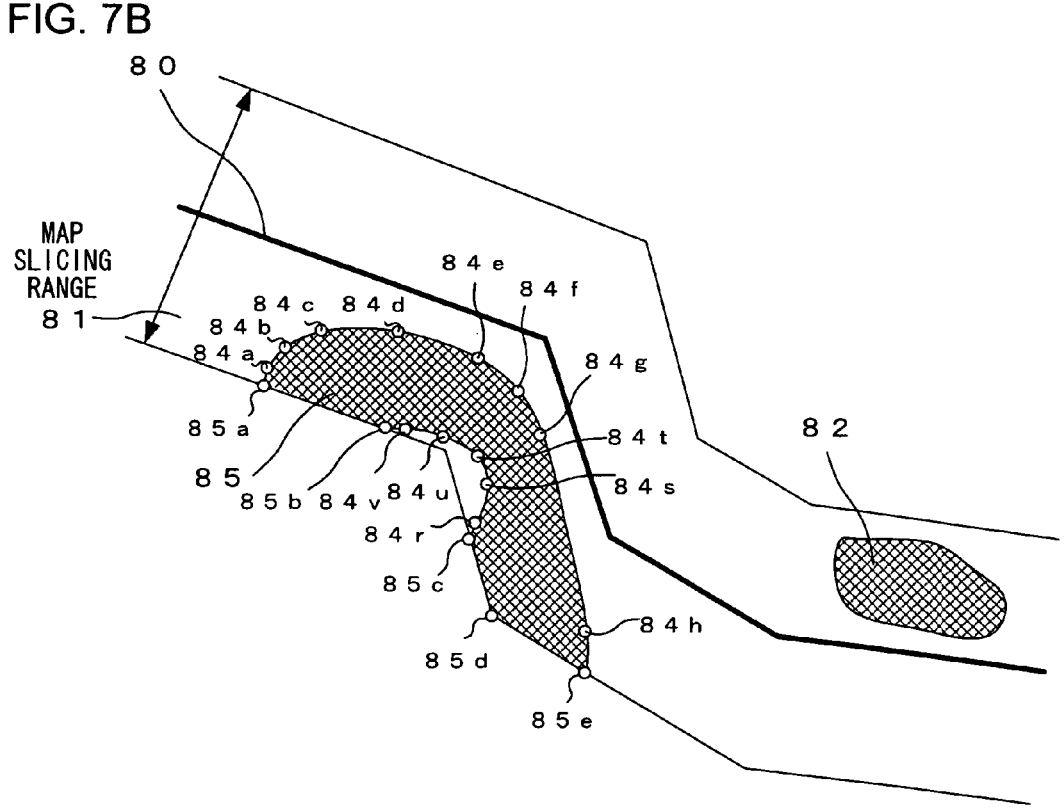
FIG. 7B shows the polygons in a sliced state.

The condition for polygon slicing and the change occurring in the polygon shape when a polygon is sliced are shown in FIGS. 7A and 7B. The map transmitting server 403 sets a map slicing range 81 through the method described above based upon a route 80 set by the route search server 404 and extracts polygon data contained in the map slicing range 81.

FIG. 7A shows the shapes of polygons before polygon data are extracted over the map slicing range 81. Polygons 82 to 84 range over the meshed areas in the figure. The entire area of the polygon 82 is contained in the map slicing range 81. The polygon 83 in its entirety is completely outside the map slicing range 81. A portion of the area of the polygon 84 is contained in the map slicing range 81, whereas other portions of the polygon 84 are outside the map slicing range 81. It is to be noted that the shape of the polygon 84 is defined with nodes 84a to 84z.

FIG. 7B shows the shapes of the polygons having been extracted over the map slicing range 81. The polygon 82 is extracted over its entire area and is transmitted as part of the map data. Since the polygon 82 is not sliced, its polygonal shape remains unchanged. Since no portion of the polygon 83 is extracted and thus the polygon 83 is not transmitted in the map data at all, the extracted polygons do not include the polygon 83. Accordingly, the polygon 83 is not sliced either.

The polygon 84 becomes transformed as a new polygon 85 having an area matching the area of the polygon 84 contained in the map slicing range 81. At this time, nodes 85a to 85e conforming to the contour of the boundary of the map slicing range 81 are newly created as data of the polygon 85, and by connecting the nodes 85a to 85e, the boundary of the polygon 85 is described. The data of the polygon 84 corresponding to the nodes indicating the shape outside the range of the polygon 85 are not included in the data of the polygon 85. In other words, the shape of the polygon 85 is defined with the nodes 84a to 84h, 84r to 84v and 85a to 85e. The polygon is thus sliced and the new polygon 85 is transmitted as map data.

Figure 8:
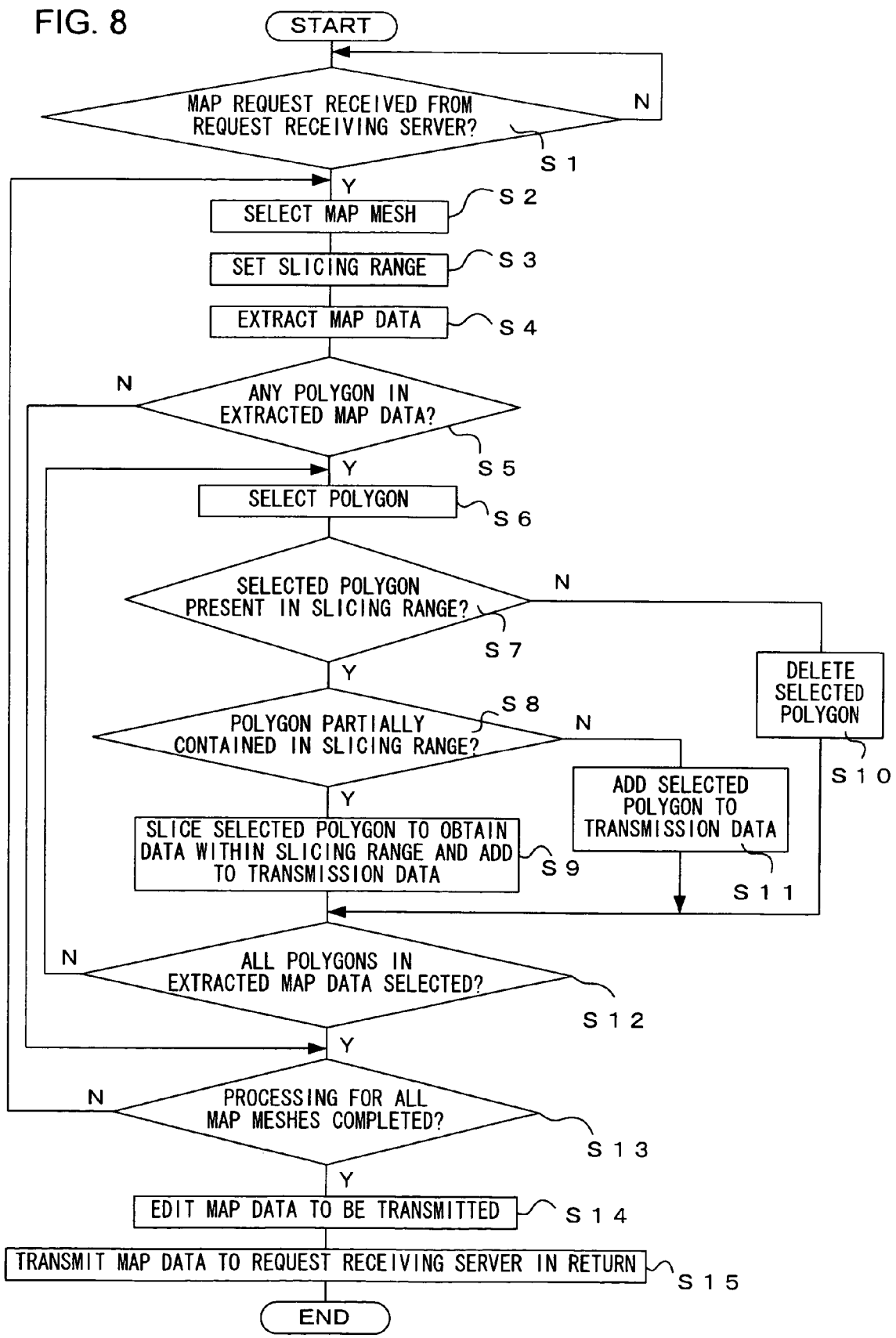
FIG. 8 presents a flowchart of the processing through which polygons are sliced in the map information transmitting system in the first embodiment.

FIG. 8 shows the flowchart of the polygon slice processing executed in the map information transmitting system in the first embodiment. The processing is constantly executed based upon a program executed by the map transmitting server 403. In step S1, a decision is made as to whether or not a map request from the request receiving server 402 has been received. The operation proceeds to the following step S2 if a map request has been received, whereas the processing in step S1 is repeatedly executed if no map request has been received.

In step S2, a map mesh is selected. The term "map mesh" as referred to in this context indicates a set of map data in one of the uniformly divided ranges (divided areas) in a given map layer. The map layer refers to the rank of the map data in hierarchical order, as defined in correspondence to a specific map scale. In step S3, the slicing range in the selected mesh is set. In step S4, the map data in the slicing range are extracted. The following is a more detailed explanation of the processing executed in steps S2 to S4.

In step S2, all the meshes through which the recommended route extending from the current point to the destination passes are extracted and one of these meshes is selected. If step 2 is executed for the first time in the processing executed in conformance to the control flow shown in FIG. 8, the mesh in which the current point is contained is selected as a first mesh. Next, a mesh adjacent to the mesh containing the current point through which the recommended route passes or near which the recommended route extends is selected as a second mesh, and a mesh adjacent to the second mesh, through which the recommended route passes is selected as a third mesh. Ultimately, the mesh containing the destination is selected as an nth mesh.

In step S3, the slicing range over which the map data are to be extracted is set with regard to the selected mesh. As the first mesh containing the current point is selected, an area surrounding the current point over, for instance, a 250 m-radius is specified and the area thus specified is set as the slicing range. If this area surrounding the current point overlaps an adjacent mesh, overlapping area in the adjacent mesh, too, is included in the slicing range corresponding to the surrounding area of the current point.

In addition, the recommended route, which is present in the mesh containing the current point but is outside the surrounding area of the current point is specified. Then, an area having, for instance, a 500 m-width with the recommended route at the center and extending along the recommended route is specified and the specified area is set as the slicing range as well. If no recommended route is present outside the surrounding area of the current point in the mesh or if the entire mesh is contained in the surrounding area of the current point, the slicing range is not set over the area along the route in this step.

If the second mesh adjacent to the mesh containing the current point, through which the recommended route passes, is selected in step S2, an area having, for instance, a 500 m-width with the route passing through the second mesh at its center and extending along the route is specified and is set as the slicing range in step S3.

If the nth mesh containing the destination is selected in step S2, an area surrounding the destination over, for instance, a 250 m-radius is specified and is set as the slicing range in step S3. If this area surrounding the destination overlaps an adjacent mesh, the overlapping area in the adjacent mesh, too, is included in the slicing range corresponding to the surrounding area of the destination. In addition, the recommended route, which is present in the mesh containing the destination but is outside the surrounding area of the destination is specified. Then, an area having, for instance, a 500 m-width with the recommended route at the center and extending along the recommended route is specified and the specified area is set as the slicing range as well. If no recommended route is present outside the surrounding area of the destination in the mesh or if the entire mesh is contained in the surrounding area of the destination, the slicing range is not set over the area along the route in this step.

In step S4, the map data within the slicing range set in step S3 are extracted. The road data maybe, for instance, link string data, constituted of a plurality of nodes connecting a start point node and an end point node. Each node in the link string data indicates coordinate values. Accordingly, road data containing node information corresponding to all the nodes with coordinate values within the area set as the slicing range are extracted. Data constituting the map data other than the road data are also obtained by extracting data in the slicing range based upon the coordinate values indicated by corresponding nodes in a similar manner. At this time, as long as at least one of the nodes defining a given polygon is contained in the slicing range, all the nodes constituting the polygon data are extracted.

Such data extraction processing is executed, starting in the mesh containing the current point and ending in the mesh containing the destination, and thus, the entire map data within the area around the route in the specific range along the route extending from the current point to the destination are extracted.

Figure 5B:
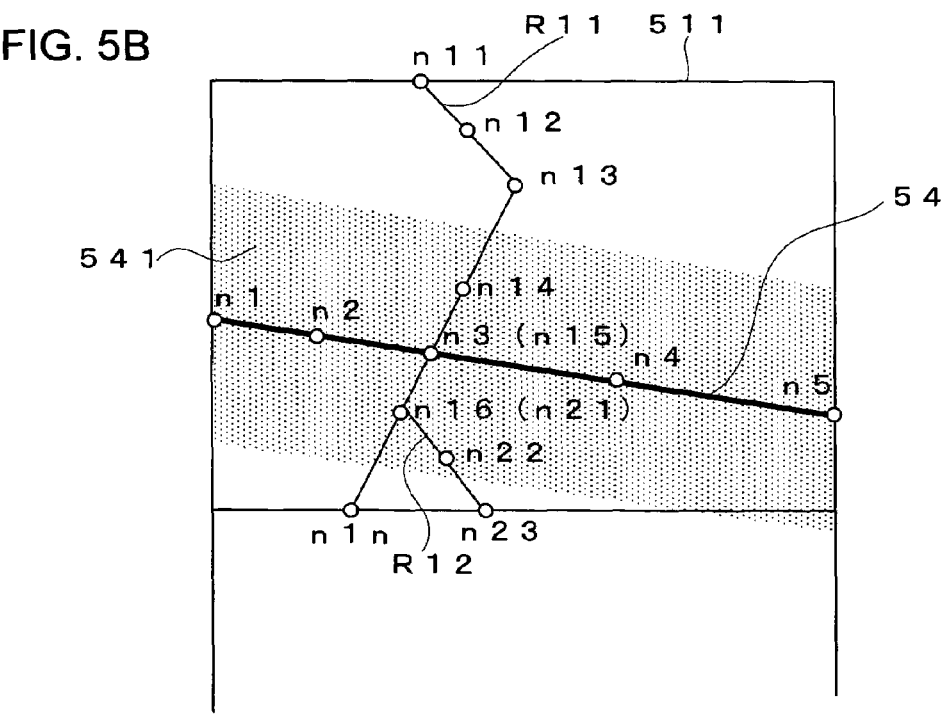
FIG. 5B is a partial enlargement of FIG. 5A.

FIG. 5B is an enlargement of a mesh 511 in FIG. 5A. Inside an area 541 surrounding the route and having, for instance, a width of 500 m with the route 54 at its center in the mesh 511, a link string R11 defined by nodes n11 to n17 and a link string R12 defined by nodes n21 to n23 are present. The nodes n14, n15, n16, n21 and n22 in the link strings R11 and R12, which are contained in the area 541 surrounding the route, are extracted. The map data corresponding to the nodes n11 to n13, n17 and n23, which are outside the slicing range are not extracted. It is to be noted that map data containing node information corresponding to all the nodes, which are in adjacent meshes overlapping the area surrounding the route and which are not passed through by the recommended route 54, are extracted as well.

In step S5, a decision is made as to whether or not there is any polygon contained in the map data extracted in step S4. If any polygon is contained in the map data, the operation proceeds to step S6, whereas if no polygon is contained in the map data, the operation proceeds to step S13. In step S6, one polygon is selected from all the polygons determined to be contained in the extracted map data in step S5. In step S7, a decision is made as to whether or not the selected polygon is even partially contained within the map slicing range. This decision may be made based upon whether or not the coordinates of some nodes that define the polygon shape are in the slicing range 81. The operation proceeds to step S8 if the polygon is present in the map slicing range, whereas the operation proceeds to step S10 if the polygon is completely outside the slicing range. In step S8, a decision is made as to whether or not only a portion of the polygon determined to be present in the map slicing range in step S7 is contained in the map slicing range (whether or not the polygon is contained in the map slicing range in its entirety). The operation proceeds to step S9 if only a portion of the polygon is determined to be contained in the map slicing range, whereas the operation proceeds to step S11 if the polygon is completely contained in the slicing range.

In step S9, the polygon determined to have a portion thereof contained in the map slicing range in step S8 is sliced to obtain the polygon area contained in the map slicing range through the method described earlier and the data of the sliced area are added to the map data to be transmitted. In step S10, the data of the polygon determined to be completely outside the map slicing range in step S7 are deleted. Thus, the corresponding polygon is not included in the map data to be transmitted. In step S11, the data of the polygon determined to be completely contained in the map slicing range in step S8, i.e., the data of the polygon present in the map slicing range in its entirety, are directly added to the map data to be transmitted. As the processing executed in any of steps S9 to S11 is complete, the operation proceeds to step S12.

In step S12, a decision is made as to whether or not the processing in steps S6 to S11 has been executed for all the polygons in the map data extracted in step S5. If it is decided that the processing has been executed for all the polygons, the operation proceeds to step S13, whereas if it is decided that the processing has not been completed yet, the operation returns to step S6. In step S13, a decision is made as to whether or not the processing in steps S2 to S12 has been executed for all the map meshes along the route with regard to which the map request was received. The operation proceeds to step S14 if the processing has been completed for all the map meshes, whereas the operation returns to step S2 to execute the processing again if it is decided that the processing has not been completed yet. In step S14, the map data containing the polygons having been individually prepared through the processing executed up to step S13 are compiled and are edited in a specific data format as shown in FIG. 6 to be used as transmission data. If a given polygon has been sliced, a flag indicating that the polygon data have been sliced is attached to the polygon add-on data in the map data to be transmitted. In step S15, the map data edited in step S13 are sent to the request receiving server. In the map information transmitting system achieved in the first embodiment, the recommended route and polygons are sliced as described above.

The following advantages are achieved in the map information transmitting system in the first embodiment.

(1) If only a portion of a polygon is contained in the map slicing range around the recommended route, polygon slice processing is executed to newly create a polygon having a shape matching the shape of its area contained in the map slicing range. As a result, even when a polygon is contained in the map of the area surrounding the route, the polygon data can be transmitted together with the road data by slicing the map. In addition, since the volume of the map data of the area around the recommended route, which are transmitted from the information transmitting center 400 to the on-vehicle apparatus 100, can be reduced, the length of time required for the communication and the communication cost can be reduced.

(2) Information indicating that the shape of a polygon has been altered is appended to the map data of the area around the recommended route which are transmitted from the information transmitting center 400 to the on-vehicle apparatus 100. As a result, the user can ascertain on the on-vehicle apparatus 100 that the shape of the polygon has been altered and if the polygon is displayed in a different color in the transmitted map on display, the user can be alerted even more effectively.

Second Embodiment

The map information transmitting system achieved in the second embodiment of the present invention is now explained. While any polygon partially contained in the map slicing range is invariably sliced in the first embodiment, a given polygon is sliced as necessary by ascertaining whether or not a slice request has been issued from the on-vehicle apparatus or by comparing the size of the data containing unsliced polygon data and the size of the data containing sliced polygon data. Since the system configuration, the method with which the map is sliced over a specific range along the route, the polygon slicing condition and the manner in which the shape of a polygon is altered through slicing in the second embodiment are all identical to those in the first embodiment, their explanation is omitted.

Figure 9A:
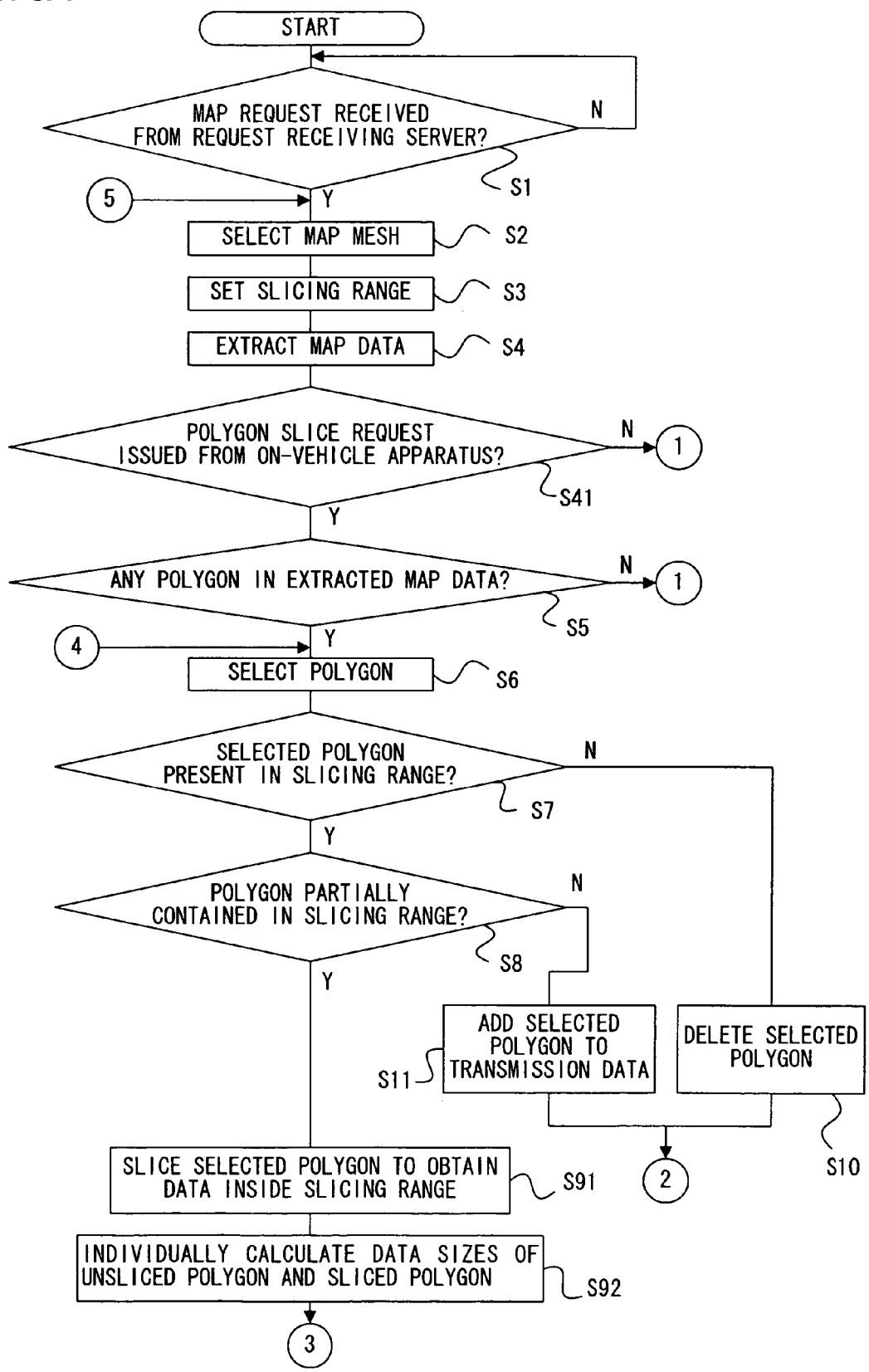
FIGS. 9A and 9B present a flowchart of the processing through which polygons are sliced in the map information transmitting system in the second embodiment.
Figure 9B:
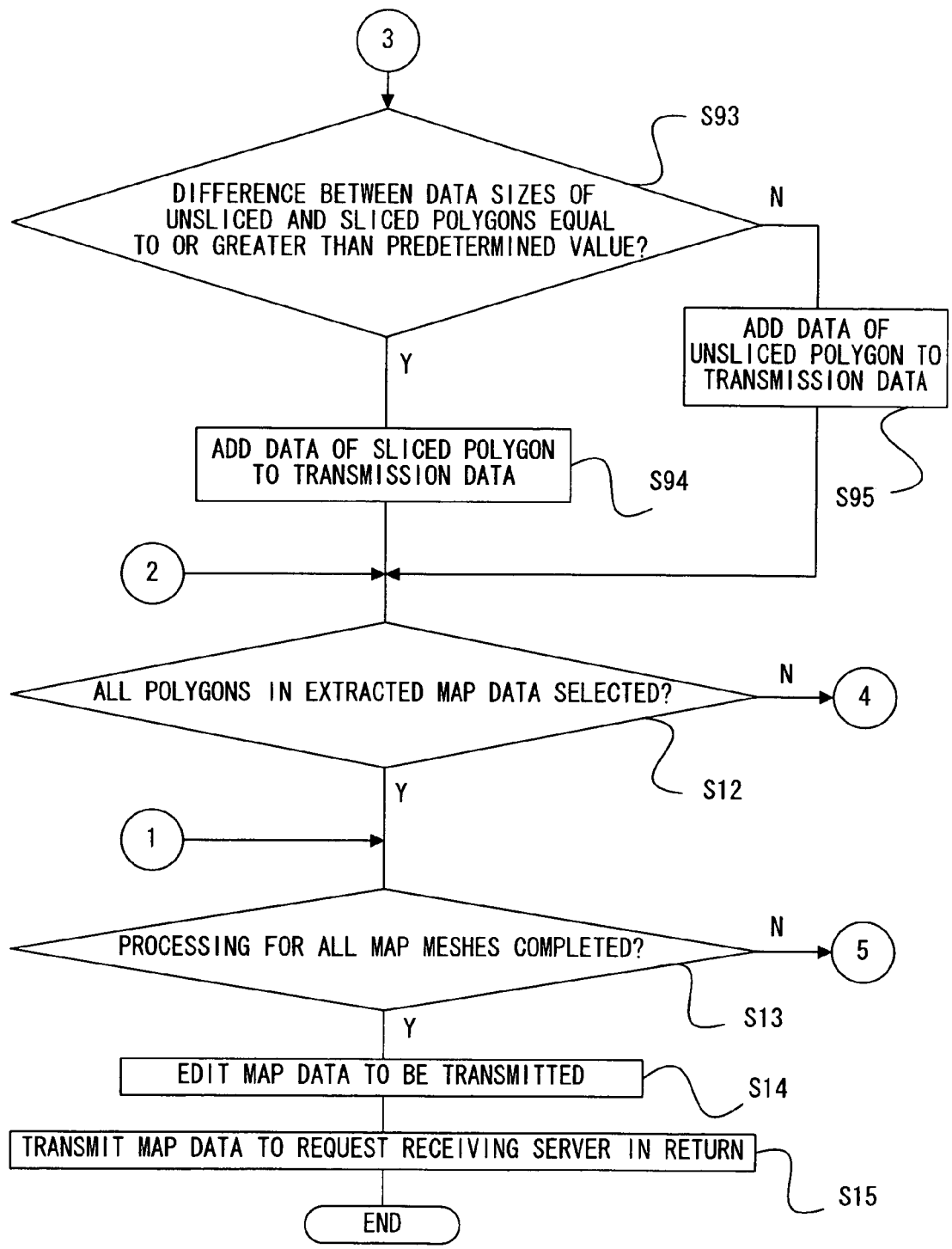

FIGS. 9A and 9B show the flowchart for the polygon slice processing executed in the map information transmitting system in the second embodiment. The processing is constantly executed based upon a program executed at the map transmitting server 403. In steps S1 to S4 in FIG. 9A, processing similar to that executed in the map information transmitting system in the first embodiment is executed.

In step S41, a decision is made as to whether or not a polygon slice request has been issued from the on-vehicle apparatus 100. The polygon slice request is issued as the user enters and sets the request through the input device 107, for instance, and the decision as to whether or not such a request has been issued may be made by checking a flag or the like contained in the data transmitted from the on-vehicle apparatus 100. The operation proceeds to step S5 if a polygon slice request has been issued, whereas if no polygon slice request has been issued, it is judged that the polygon slice processing is not to be executed and, accordingly, the operation proceeds to step S13. In steps S5 through S8, processing similar to that executed in the map information transmitting system in the first embodiment is executed.

In step S91, the polygon determined to be partially contained in the map slicing range in step S8 is sliced to obtain the data corresponding to its area contained in the map slicing range through a method similar to that adopted in the map information transmitting system in the first embodiment. However, unlike in the first embodiment, the sliced polygon data are not included in the map data to be transmitted at the stage.

In step S92, the data size of the polygon before undergoing the slice processing in step S91 and the data size of the polygon resulting from the slice processing executed in step S91 are individually calculated. The term "data size" in this context refers to the volume of data that are to be transmitted. After executing step S92, the operation proceeds to step S93 in FIG. 9B. In step S93, the data size of the sliced polygon calculated in step S92 is subtracted from the data size of the unsliced polygon calculated in step S92 and a decision is made as to whether or not the difference is equal to or greater than a predetermined value. The operation proceeds to step S94 if the difference is determined to be equal to or greater than the predetermined value, whereas the operation proceeds to step S95 if the difference is determined to be smaller than the predetermined value. In step S94, the polygon data resulting from the slice processing executed in step S91 are added to the map data to be transmitted. In step S95, the polygon data before undergoing the slice processing in step S91, i.e., the polygon data contained in the original map data, are directly added to the map data to be transmitted. Upon completing the processing in either step S94 or step S95, the operation proceeds to step S12.

The predetermined value used in the decision-making in step S93 may be set to, for instance, 0, so that the sliced polygon data are included in the map data for transmission if the data size of the sliced polygon is smaller than the data size of the unsliced polygon.

In steps S12 to S15, processing similar to that executed in the map information transmitting system in the first embodiment is executed. Polygons are sliced as described above in the map information transmitting system in the second embodiment.

It is to be noted that while the decision as to whether the unsliced polygon data or the sliced polygon data should be included in the map data to be transmitted is made based upon whether or not the difference between the data sizes is equal to or greater than the predetermined value in the explanation given above, this decision may be made based upon whether or not the difference between the data sizes is equal to or smaller than a specific value or whether or not the difference is within a predetermined range. Alternatively, the areas of the unsliced polygon and the sliced polygon may be compared so as to make the decision based upon whether the areal ratio is equal to or greater than a predetermined value or equal to or smaller than a predetermined value, or whether or not the areal ratio is within a predetermined range.

The map information transmitting system in the second embodiment achieves the following advantage as well as the advantages of the map information transmitting system in the first embodiment. In the map information transmitting system in the second embodiment, polygon data of a sliced polygon are transmitted in the map data when requested by the user or when the results of the comparison of the unsliced polygon and the sliced polygon satisfies a predetermined condition. As a result, if the length of time required for the communication or the communication cost can be reduced, the polygon contained within the slicing range (the new polygon data) alone is transmitted, or if the length of the communication time or the communication cost is not significantly reduced, the entire polygon including the area outside the slicing range (the original polygon data) is transmitted. Thus, any polygon data, the slicing of which would not significantly reduce the length of communication time or the communication cost can be displayed in their entirety without slicing the data unnecessarily.

Third Embodiment

The map information transmitting system achieved in the third embodiment of the present invention is explained. In the map information transmitting system achieved in the third embodiment, a polygon slicing range is set separately from the map slicing range and the information with respect to the polygon slicing range is transmitted from the information transmitting center to the on-vehicle apparatus. Then, polygons undergo slice processing at the on-vehicle apparatus based upon the information thus transmitted and the resulting polygon data are displayed.

FIG. 10 shows the flowchart of the processing through which the polygon slicing range is set separately from the map slicing range and the data in the polygon slicing range are transmitted to the on-vehicle apparatus in the map information transmitting system in the third embodiment. The processing is constantly executed based upon a program executed at the map transmitting server 403. Since the system configuration and the method of slicing the map within a specific range along the route adopted in the third embodiment are identical to those in the first and second embodiments, their explanation is omitted. In steps S1 to S3, processing similar to that executed in conformance to the processing flows adopted in the map information transmitting systems in the first and second embodiments is executed.

In step S31, a polygon slicing range (a second slicing range) is set separately from the map slicing range (a first slicing range) set in step S3. This polygon slicing range may be set narrower as, for instance, the scaling factor set in correspondence to each layer increases (as the map on display becomes more detailed) so as to ensure that a range appropriate for screen display is set. In step S4, polygon data and map data other than the polygon data are individually extracted over the slicing ranges set in steps S3 and S31. At this time, if any of the nodes defining a given polygon is contained in the polygon slicing range, all the nodes defining the polygon are extracted, as in the first embodiment. After step S4, the operation proceeds to step S13 without executing the polygon slice processing, unlike in the first and second embodiments. In steps S13 and S14, processing similar to that executed in conformance to the processing flows adopted in the map information transmitting systems in the first and second embodiments is executed.

In step S141, information indicating the polygon slicing range set in step S31 is appended to the transmission data. This information includes, for instance, numerical value data indicating a width set with recommended route at the center. In step S15, the map data edited in step S14 and step S141 are transmitted to the request receiving server 402. The polygons contained in the map data have not undergone any polygon slice processing yet. Namely, the map data contain polygon data corresponding to polygon areas outside of the polygon slicing range.

Figure 11A:
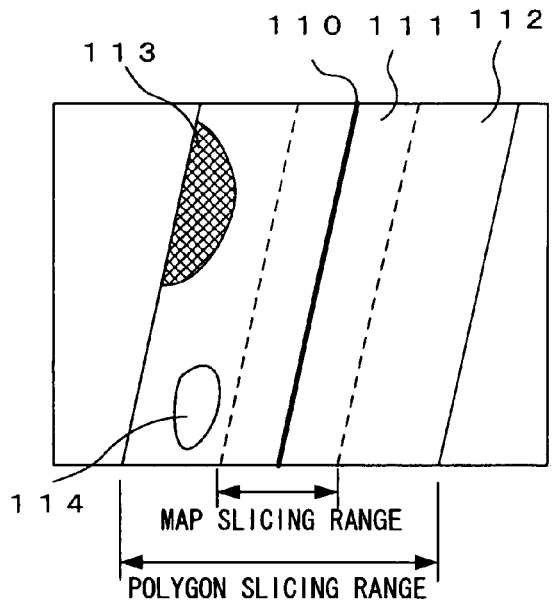
FIG. 11A shows a change in the display of a sliced polygon area.
Figure 11B:
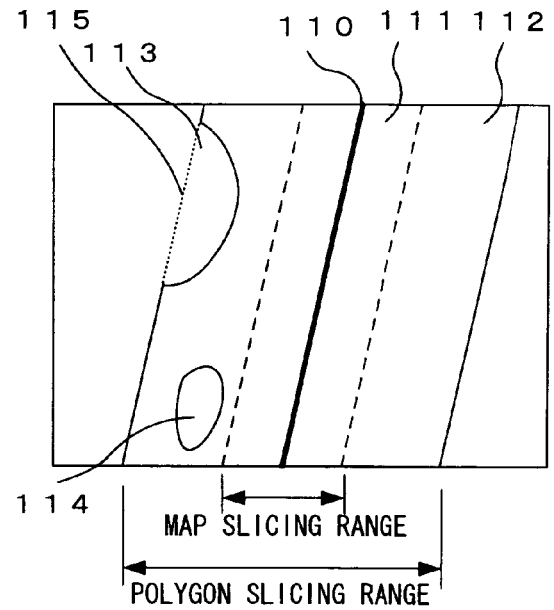
FIG. 11B shows a change in the display of the boundary of a sliced polygon area.

Upon receiving the map data described above, the on-vehicle apparatus 100 executes polygon slice processing similar to that explained in reference to the first embodiment in conformance to the polygon slicing range and displays the results of the polygon slice processing at the display monitor 106. Examples of display screens are presented in FIGS. 11A to 1D. FIG. 11A presents an example in which a polygon, the shape of which has been altered through the slice processing, is displayed differently from the display of a normal polygon area, the shape of which has not been altered. At the on-vehicle apparatus 100, the map data extracted over a specific map slicing range 111 and a specific polygon slicing range 112 relative to a route 110 are received and displayed. At this time, a polygon 113, the shape of which has been altered through the slice processing, is displayed in a display mode different from the display mode of a polygon 114, the shape of which has not been altered. The different display mode may be achieved by, for instance, using different colors or displaying one type of polygon as a meshed area. Alternatively, as shown in FIG. 11B, an area 115 at the boundary of the polygon slicing range may be displayed differently. Such a different display may be achieved by, for instance, changing the type of line used for the display of the area from a solid line to a dotted line.

Figure 11C:
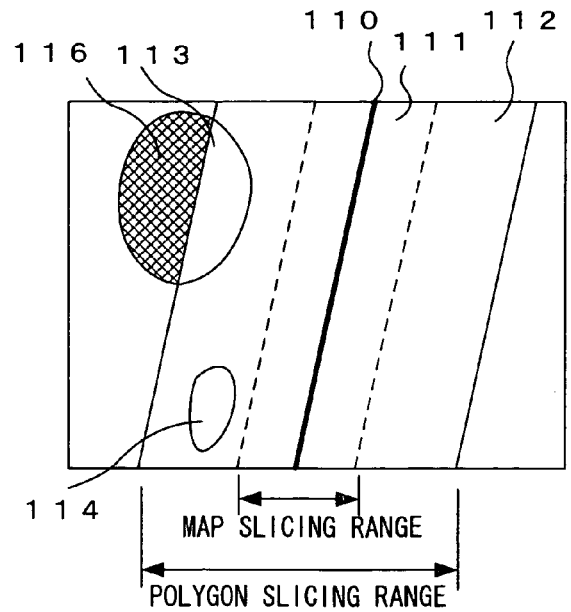
FIG. 11C shows a change in the display of the area outside the polygon slicing range.
Figure 11D:
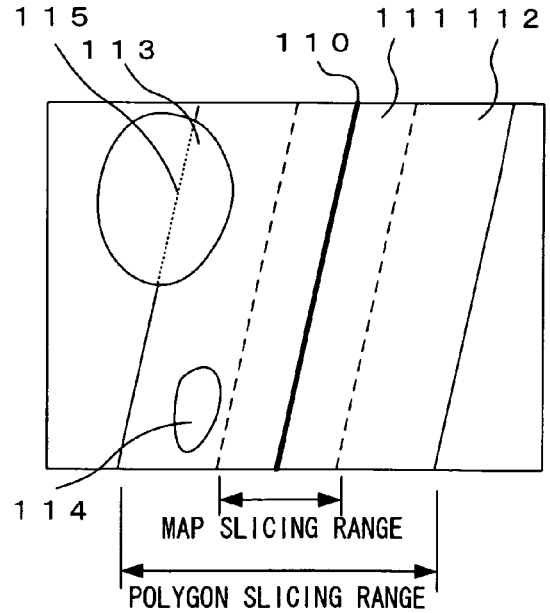
FIG. 11D shows a change in the display of the boundary between the area outside the polygon slicing range and the area inside the polygon slicing range.

As a further alternative, the polygon area outside the polygon slicing range may also be displayed by assuming a different display mode for the outside polygon area from the display mode for the polygon area contained in the polygon slicing range. In the display example presented in FIG. 11C, a polygon area 116 outside the polygon slicing range is meshed on display to differentiate it from the polygon areas 113 and 114 contained in the polygon slicing range. Such differentiation may be achieved by using different display colors instead. Or, as shown in FIG. 11D, the boundary between the polygon 113 and the polygon 116, i.e., a boundary portion 115 defined by the polygon slicing range, maybe indicated with a dotted line, so as to indicate the range over which the polygon is sliced on display.

In addition to the advantages of the map information transmitting systems achieved in the first and second embodiments, the map information transmitting system in the third embodiment achieves the following advantage. Since the polygon slicing range is set wider than the map slicing range, the instance of planar data indicating a polygon area being displayed only in part is reduced and, as a result, the user is provided with a more natural-looking map display. In addition, polygons having undergone the slice processing is displayed differently from normal unsliced polygon areas, visual recognition of the sliced polygon areas is facilitated.

It is to be noted that while an explanation is given in reference to the third embodiment on an example in which polygons are sliced at the on-vehicle apparatus, the information transmitting systems in the first and second embodiments may also do in such way. In such a case, the processing is executed at the information transmitting center and information that enables a screen display is transmitted to the on-vehicle apparatus. In addition, the information indicating the polygon slicing range does not need to be transmitted from the information transmitting center to the on-vehicle a apparatus. Alternatively, the polygon slicing range may be set at the on-vehicle apparatus.

Figure 12:
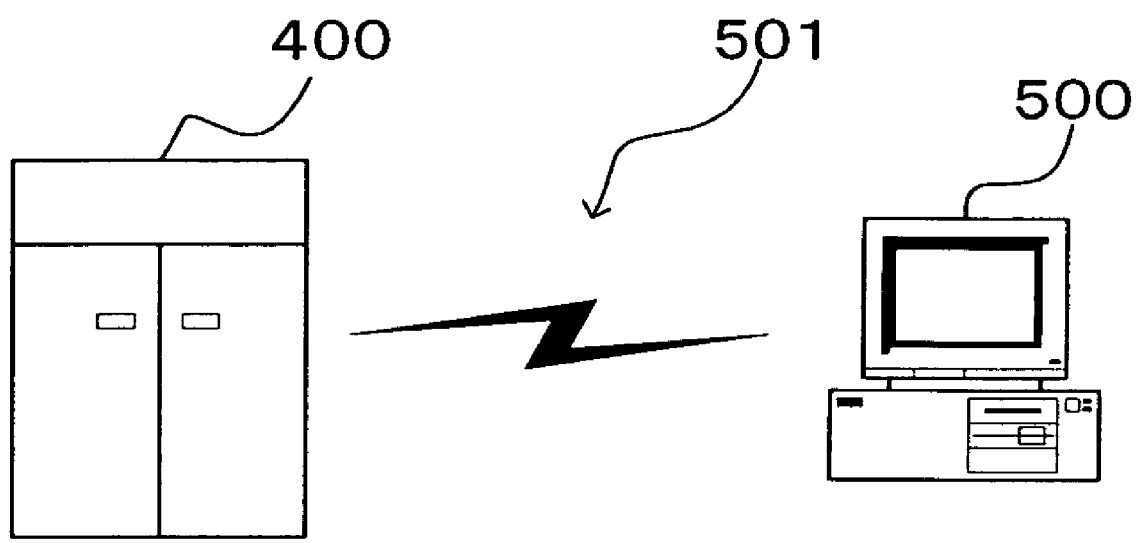
FIG. 12 illustrates how the present invention may be adopted in conjunction with a personal computer.

While an explanation is given above in reference to the embodiments on an example in which the present invention is adopted in an navigation apparatus, the present invention may be adopted in conjunction with any of the various map transmitting technologies whereby a map is transmitted to be displayed at a terminal. For instance, the map data for transmission described above may be provided via a data signal on the Internet or the like by adopting the present invention in conjunction with a personal computer or the like. FIG. 12 illustrates how this maybe achieved. A personal computer 500, which can be connected to a communication line 501, is provided with the map data transmitted from an information transmitting center 400. The information transmitting center 400 has functions similar to those explained earlier in reference to FIG. 3. The communication line 501 may be a communication line that enables Internet communication or personal computer communication or it may be a dedicated communication line. The information transmitting center 400 receives a route search request from the personal computer via the communication line 501 and transmits map data for transmission with regard to the route to the personal computer 500. In other words, the map data for transmission are converted to a signal on a carrier wave through which a transmission medium is carried and the signal resulting from the conversion is transmitted via the communication line 501. Thus, the map data for transmission can be distributed in the form of a computer-readable computer program product adopting any of various modes.

The above described embodiments are examples and various modifications can be made without departing from the spirit and scope of the invention.

What is claimed is:

1. A map data transmitting method, comprising steps of:
setting a specific route;
specifying map data contained in a slicing range which is set along the route having been set and which has a fixed width with a predetermined distance from the route based upon map data that include road data and background data;
newly creating a new polygon data if an original polygon data contained in the background data included in the specified map data is partially contained in the slicing range and another portion of the original polygon data is outside the slicing range, by removing polygon data corresponding to the portion outside the slicing range from the original polygon data; and
transmitting by wireless transmission via a mobile communication network a road map specified in correspondence to the map data and background data containing the new polygon data.

2. A map data transmitting method according to claim 1, wherein:
in the transmitting step, either the original polygon data or the new polygon data are transmitted based upon data volumes of the original polygon data and the new polygon data.

3. A map data transmitting method according to claim 2, wherein:
in the transmitting step, either the original polygon data or the new polygon data are transmitted based upon a difference between the data volumes of the original polygon data and the new polygon data.

4. A map data transmitting method according to claim 2, wherein:
in the transmitting step, either the original polygon data or the new polygon data are transmitted based upon an areal ratio of the original polygon data and the new polygon data.

5. A map data transmitting apparatus that executes a map data transmitting method according to claim 4.

6. A map data transmitting method according to claim 2, wherein;
when the new polygon data are transmitted, information indicating that the new polygon data are transmitted is appended to transmission data being transmitted.

7. A map data transmitting apparatus that executes a map data transmitting method according to claim 5.

8. A map data transmitting method according to claim 1, wherein:
the route which is set is a recommended route calculated based upon a current point and a destination indicated in a route search request having been transmitted.

9. A map data transmitting apparatus that executes a map data transmitting method according to claim 8.

10. A map data transmitting apparatus that executes a map data transmitting method according to claim 1.

11. An information terminal comprising:
a reception unit that receives map data transmitted from a map data transmitting apparatus according to claim 10; and
a display unit that displays a map based upon the map data having been received.

12. An information terminal according to claim 11 further comprising:
a requesting unit that issues a request for the new polygon data.

13. An information terminal according to claim 12, wherein:
the new polygon data are displayed in a display mode which indicates that the polygon data on display are different from the original polygon data.

14. An information terminal according to claim 11, wherein:
the new polygon data are displayed in a display mode which indicates that the polygon data on display are different from the original polygon data.

15. A map data transmitting method according to claim 1, wherein:
the new polygon data is created by newly creating nodes conforming to a contour of a boundary of the slicing range and by connecting the nodes.

16. A map data transmitting method according to claim 1, wherein:
the new polygon data corresponds to a new polygon created by changing a shape of an original polygon represented by the original polygon data.

17. An information terminal that receives map data having been transmitted and displays a map, comprising:
a reception unit configured to receive map data by wireless transmission via a mobile communication network which include road data and background data corresponding to a slicing range which is set along the route having been set and which has a fixed width with a predetermined distance from the route;
a creation unit that newly creates a new polygon data, if an original polygon data contained in the background data included in the map data is partially contained in the slicing range and another portion of the original polygon data is outside the slicing range, by removing polygon data corresponding to the portion outside the slicing range from the original polygon data; and
a display unit that displays a map based upon the map data and the new polygon data having been received.

18. An information terminal according to claim 17, wherein:
the new polygon data are displayed in a display mode which indicates that the polygon data on display are different from the original polygon data.

19. An information terminal according to claim 17, wherein:
the creation unit creates the new polygon data by newly creating nodes conforming to a contour of a boundary of the slicing range and by connecting the nodes.

20. An information terminal according to claim 17, wherein:
the new polygon data corresponds to a new polygon created by changing a shape of an original polygon represented by the original polygon data.

21. A map data transmitting method comprising steps of:
setting a specific route;
extracting road data corresponding to a first slicing range, which is set along the route having been set and which has a fixed width with a specific first distance from the route, and background data corresponding to a second slicing range, which is set along the route having been set and which has a fixed width with a specific second distance from the route which is not equal to the first distance, based upon map data that include road data and background data; and
transmitting by wireless transmission via a mobile network the road data and the background data having been extracted.

22. A map data transmitting method according to claim 21, wherein:
in the extracting step, if an original polygon data contained in the extracted background data is partially contained in the second slicing range and another portion of the polygon is outside the second slicing range, polygon data are newly created by removing polygon data corresponding to the portion outside the second slicing range from the original polygon data and background data containing the new polygon data are transmitted.

23. A map data transmitting method according to claim 22, wherein:
the route which is set is a recommended route calculated based upon a current point and a destination indicated in a route search request having been transmitted.

24. A map data transmitting apparatus that executes a map data transmitting method according to claim 22.

25. A map data transmitting method according to claim according to claim 22, wherein:
the polygon data is newly created by newly creating nodes conforming to a contour of a boundary of the slicing range and by connecting the nodes.

26. A map data transmitting method according to claim 22, wherein
the new polygon data corresponds to a new polygon created by changing a shape of an original polygon represented by the original polygon data.

27. A map data transmitting method according to claim 21, wherein:
the route which is set is a recommended route calculated based upon a current point and a destination indicated in a route search request having been transmitted.

28. A map data transmitting apparatus that executes a map data transmitting method according to claim 27.

29. A map data transmitting apparatus that executes a map data transmitting method according to claim 21.

30. An information terminal, comprising:
a reception unit that receives map data transmitted from a map data transmitting apparatus according to claim 29; and
a display unit that displays a map based upon the map data having been received.

31. An information terminal according to claim 30, wherein:
the new polygon data are displayed in a display mode which indicates that the polygon data on display are different from the original polygon data.

32. A map data transmitting system, comprising:
a map data transmitting apparatus that executes a map data transmitting method having the steps of:
setting a specific route;
specifying map data contained in a slicing range which is set along the route having been set and which has a fixed width with a predetermined distance from the route based upon map data that include road data and background data;
newly creating a new polygon data if an original polygon data contained in the background data included in the specified map data is partially contained in the slicing range and another portion of the original polygon data is outside the slicing range, by removing polygon data corresponding to the portion outside the slicing range from the original polygon data;

transmitting by wireless transmission via a mobile communication network a road map specified in correspondence to the map data and background data containing the new polygon data; and an information terminal, including:

a reception unit configured to receive map data transmitted from the map data transmitting apparatus by wireless transmission via a mobile communication network; and a display unit that displays a map based upon the map data having been received.

33. A map data transmitting system according to claim 32, wherein:

the new polygon data is created by newly creating nodes conforming to a contour of a boundary of the slicing range and by connecting the nodes.

34. A map data transmitting system according to claim 32, wherein:

the new polygon data corresponds to a new polygon created by changing a shape of an original polygon represented by the original polygon data.

* * * * *